Sept. 11, 1951 C. L. DAVIS 2,567,324
SELF-ALIGNING REARVIEW MIRROR MOUNTING
Filed Oct. 19, 1950 3 Sheets-Sheet 1
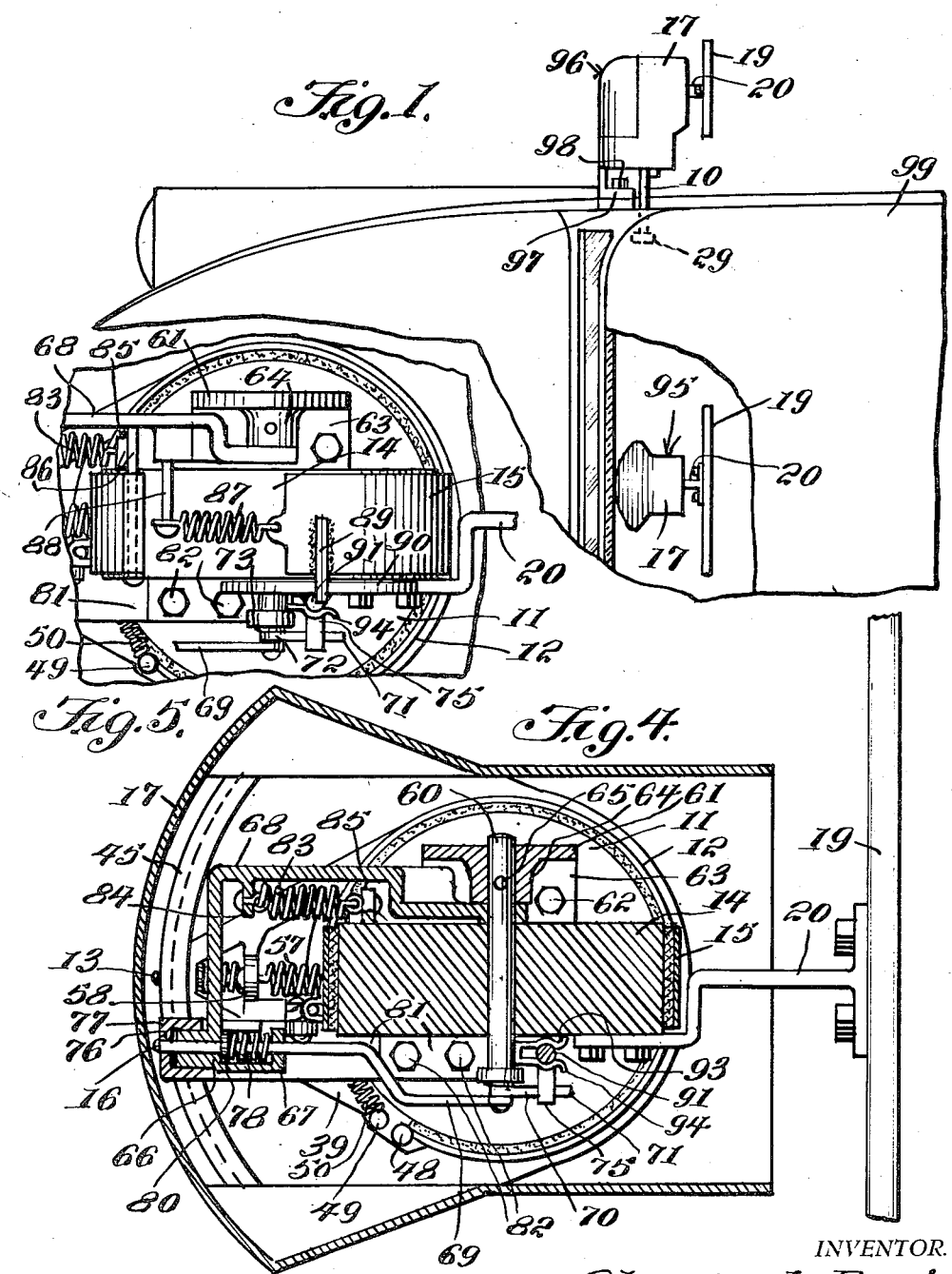
INVENTOR.
Chester L. Davis,
BY Victor J. Evans & Co.
ATTORNEYS

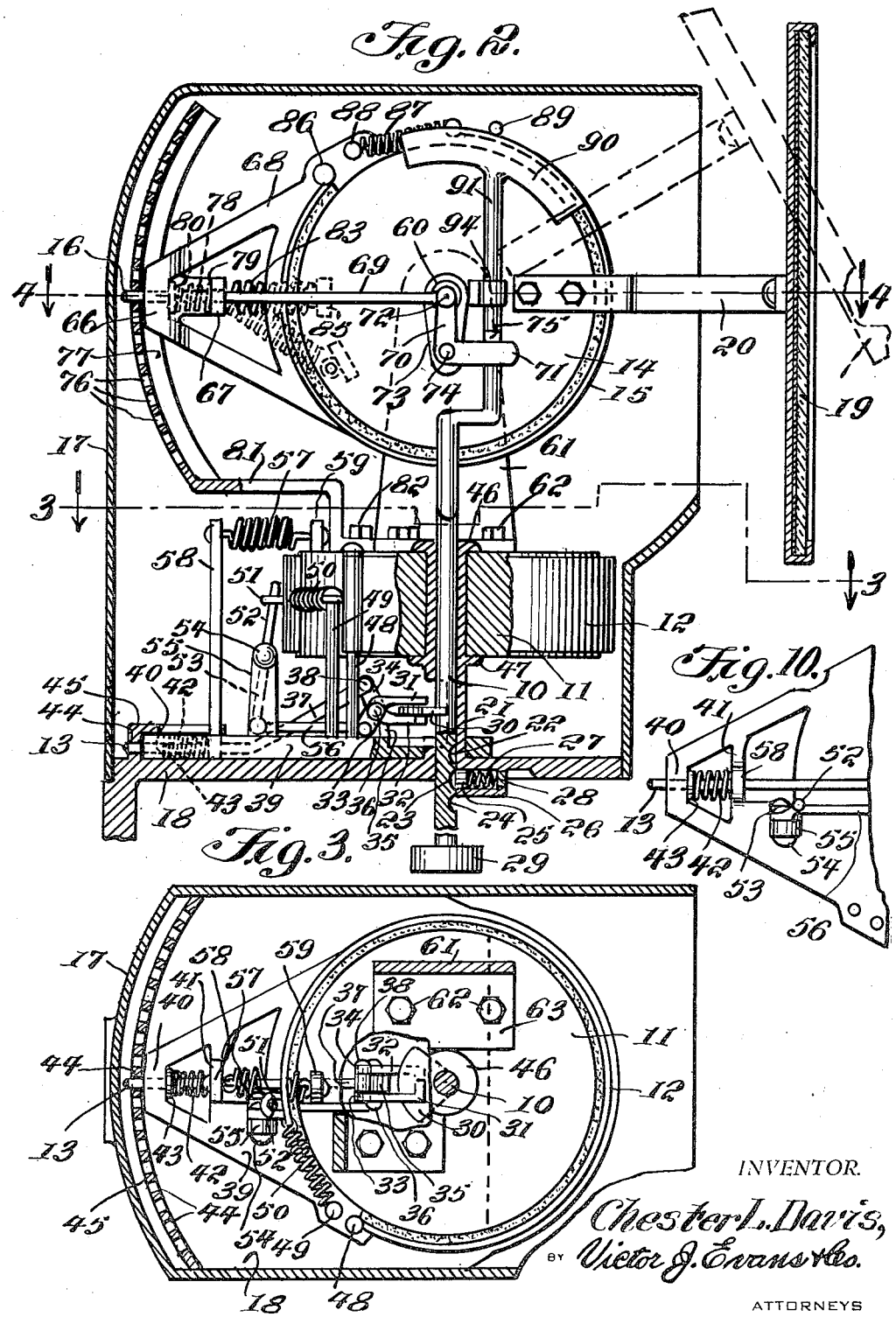

Sept. 11, 1951        C. L. DAVIS        2,567,324
SELF-ALIGNING REARVIEW MIRROR MOUNTING
Filed Oct. 19, 1950        3 Sheets—Sheet 3
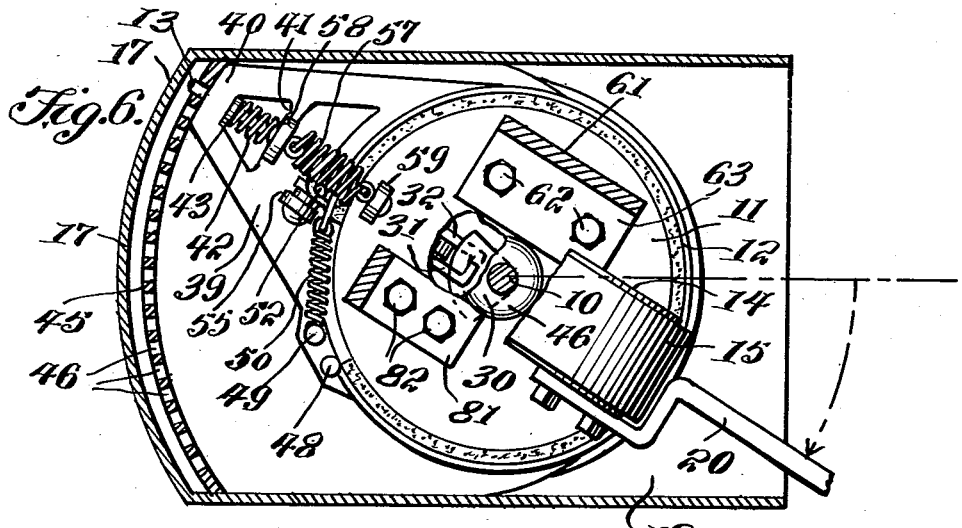
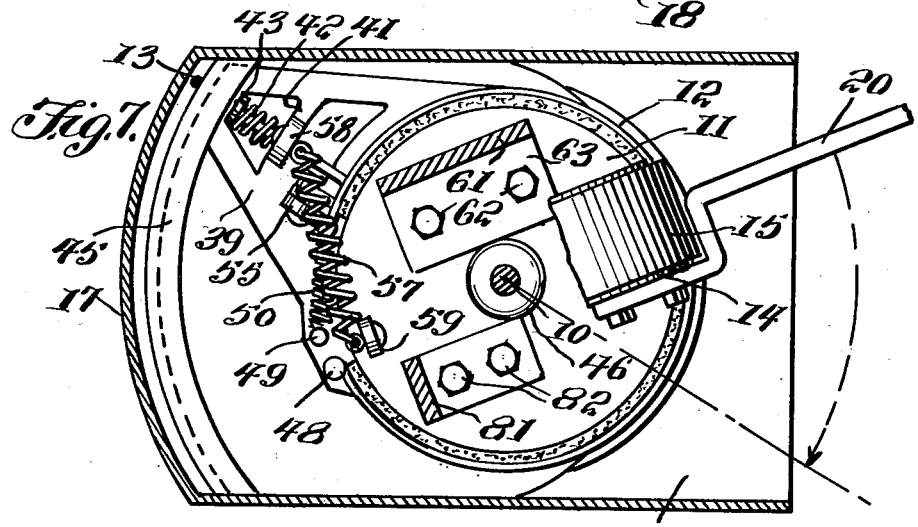
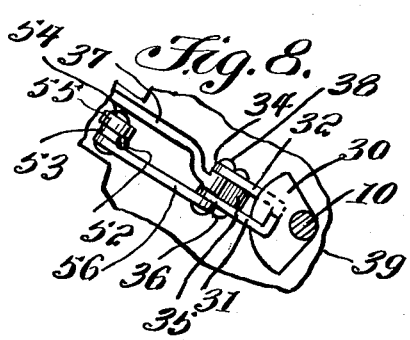
INVENTOR.
Chester L. Davis,
BY Victor J. Evans & Co.
ATTORNEYS Patented Sept. 11, 1951

2,567,324

UNITED STATES PATENT OFFICE 2,567,324

SELF-ALIGNING REARVIEW MIRROR MOUNTING

Chester L. Davis, Coeburn, Va., assignor of one-half to Cassie E. Adkins, Coeburn, Va.

Application October 19, 1950, Serial No. 190,918

5 Claims. (Cl. 88—98)

1

This invention relates to rear view mirrors of the type used in and on the sides of motor vehicles, and in particular a mounting whereby once the position of a mirror is adjusted to correspond with the operator of the vehicle, it will upon operation of a button or latch, return to the adjusted position even though it may have been moved by the operator or other occupants of the vehicle to different positions.

The purpose of this invention is to eliminate the necessity of the operator of a motor vehicle manually adjusting the positions of mirrors therein while endeavoring to drive the vehicle through traffic.

Substantially all operators of motor vehicles are inconvenienced at some time by the fact that while operating a motor vehicle in an emergency where it is necessary to instantly determine the position of vehicles to the rear or at the sides, of finding that the mirror has been turned to a different position. By the time the mirror has been readjusted to the correct position the emergency has passed. With this thought in mind this invention contemplates means whereby an operator of a motor vehicle may press a button to adjust the position of a rear view mirror and wherein upon operation of the button the mirror automatically returns to the correct driving position for the operator.

The object of this invention is, therefore, to provide means that may be incorporated in a mounting for motor vehicle mirrors whereby a mirror is actuated to a predetermined position as a button is pressed.

Another object of the invention is to provide resetting means for motor vehicle mirrors whereby even though a mirror may have been moved both horizontally and vertically it will snap automatically back to a position to which it may have been adjusted by the operator of the vehicle in which the mirror is positioned.

A further object of the invention is to provide an improved mounting for motor vehicle mirrors wherein mirrors that have been moved out of alignment for an operator of a vehicle will automatically reset upon operation of a button, which is of a simple and economical construction.

With these and other objects and advantages in view the invention embodies a vertically disposed brake drum upon which a mirror mounting bracket is carried, a horizontally disposed brake drum upon which the vertically disposed brake drum is mounted, brake bands for frictionally retaining the brake drums in adjusted positions, latch elements for retaining the brake drums in

2 adjusted positions, and means for releasing the latch elements and also the tension on the brake bands.

Other features and advantages of the invention will appear from the following description taken in connection with the drawings wherein:

Figure 1 is a plan view showing a portion of a motor vehicle body with one of the improved rear view mirror mountings positioned adjacent the windshield of the vehicle and another of said mountings extended from one side of the vehicle.

Figure 2 is a vertical section through the rear view mirror mounting showing the mirror in a centrally disposed position and showing parts in elevation and other parts broken away.

Figure 3 is a sectional plan taken on line 3—3 of Figure 2 showing the lower horizontally disposed brake drum and latch for retaining the drum in adjusted positions.

Figure 4 is a cross section taken on line 4—4 of Figure 2 showing the upper or vertical position of the brake drum with the latch mirror bracket carried thereby.

Figure 5 is a similar view looking from a point above showing the parts in elevation and illustrating the brake band connections of the upper drum.

Figure 6 is a sectional plan similar to that shown in Figure 3 showing a portion of the upper drum with the mirror carrying bracket extended therefrom and showing the drum adjusted to an extreme position.

Figure 7 is a similar view showing the upper drum and mirror carrying bracket extended from one side of the center with the lower drum adjusted to a position on the opposite side of the center.

Figure 8 is a detail illustrating the inner ends of the actuating levers for operating the brake and latch instrumentalities of the lower drum.

Figure 9 is a similar view showing the parts adjusted to a position on the opposite side of the center.

Figure 10 is a detail showing the outer end of the lower latch carrying arm.

Referring now to the drawings wherein like reference characters denote corresponding parts the improved mirror mounting of this invention includes an operating stem 10, a lower horizontally disposed brake drum 11 having a brake band 12 thereon and a latch pin 13 extended therefrom, an upper vertically disposed brake drum 14 having a band 15 thereon and a latch pin 16 extended therefrom, a mounting housing 17 having a base 18, a mirror 19 carried by a bracket 20, and suitable operating instrumentalities for actuating the latch pins and brake bands by the stem 10.

The stem 10 is vertically slidable in a bearing sleeve 21 extended upwardly from the base 18 and one side of the stem is provided with spaced notches 22, 23 and 24 which are positioned to coact with a pin 25 in a socket 26, the pin being resiliently urged toward the stem 10 by a spring 27. The spring is retained in the socket by a plug 28.

The lower end of the stem 10 is provided with a button 29 by which the stem is actuated from the neutral position illustrated in Figure 2 with the pin 25 in the recess 23 to upper and lower positions, the stem being drawn downwardly with the pin 25 registering with the recess 22 to withdraw the latch pins 13 and 16, and upwardly with the pin 25 extended into the recess 24 to release the band of the brake drum.

The stem 10 is provided with a segment 30 which extends between the ends 31 and 32 of levers 33 and 34, respectively.

The levers 33 and 34 are pivotally mounted in a bearing 35 by a pin 36 and the outer end of the lever 34 is connected to the shank 37 of the latch pin 13 by a pin 38. The latch pin is slidably mounted in the arm 39 through bearings 40 and 41 and the pin is resiliently held outwardly by a spring 42, one end of which is positioned against the bearing 41 and the other against a collar 43 on the latch pin. As illustrated in Figures 2 and 3 the latch pin 13 is positioned to extend into openings 44 in a segment 45 on the base 18 and when it is desired to move the position of the arm 39, which is pivotally mounted on the bearing sleeve 21, the button 29 is drawn downwardly and as the end 32 of the lever 34 moves downward the opposite end draws the latch pin inwardly out of an opening 44 of the segment 45.

The brake drum 11 is journaled on the bearing sleeve 21 and positioned between the collars 46 and 47. The brake band 12, which is positioned around the drum, is mounted on the arm 39 by a post 48, at one end and the opposite end is connected to a similar post 49 by a spring 50, as shown in Figure 3. The end to which the spring 50 is attached is provided with an eye 51 through which the upper end 52 of a lever 53 that is pivotally mounted by a pin 54 in a bearing 55, extends, as shown in Figure 2. The lower end of the lever 53 is connected to the lever 33 by a link 56 and as the button 29 of the stem 10 is pressed upwardly the segment 30 moves the end 31 of the lever 33 upwardly whereby the link 56 draws the lower end of the lever 53 inwardly moving the upper end outward and thereby releasing the brake band 12 from the drum 11.

The drum 11 is urged toward the neutral position by a spring 57, one end of which is connected to an arm 58, extending upwardly from the bearing 41, and the other to a lug 59 extended upwardly from the upper surface of the drum 11.

The upper vertically disposed brake drum 14 is journaled on a shaft 60 carried by a bracket 61, the bracket being mounted on the drum 11 by bolts 62 in a flange 63 and the shaft being secured in a hub 64 of the bracket by a pin 65.

The latch pin 16 in the upper vertically disposed drum 14 is slidably mounted in bearings 66 and 67 of an arm 68 that is journaled on the pin 60, as shown in Figure 4 and the shank 69 of the pin 16 is pivotally connected to an arm 70 of a bell crank 71 by a pin 72, the bell crank being pivotally mounted on a plate 73 extended downwardly from the pin 60, by a pin 74. As the button 29 is drawn downwardly the stem 10, which is provided with an offset section 75 engages the bell crank 71 drawing the end thereof downwardly and at the same time drawing the latch pin 16 inwardly out of one of the openings 76 in the segment 77. The latch pin is resiliently held outwardly by a spring 78, one end of which is held against a shoulder 79 of the arm 68 and the other against a collar 80 on the pin.

The segment 77 is mounted on the drum 11, through a flange 81 and bolts 82.

The drum 14 is resiliently urged to a neutral position in which the bracket 20 extends straight outwardly, as shown in Figure 2, by a spring 83, one end of which is held in a projection 84 of the arm 68 and the other in a lug 85 on the drum 14.

The brake band 15 is mounted on the arm 68 by a pin 86, at one end and the opposite end is mounted, through a spring 87 on a similar pin 88. The end of the brake band on which the spring is positioned is provided with a lug 89 that extends over the edge, as shown in Figure 5 and this lug is positioned to engage a segment 90 on an arm 91 extended upwardly on the offset section 92 of the stem 10, the said arm 91 being held between spring clips 93 and 94, as shown in Figure 4.

Upward movement of the stem 10 by the button 29 actuates the shoe or segment 90 to elevate the plug 89 which relieves the tension on the brake band 15 whereby the spring 83 urges the mirror mounting bracket 20, through the drum 14 to a position aligned with the latch pins 16, as shown in Figure 2.

The spring fingers 93 and 94 are carried by the pin 60, as shown in Figure 4.

With the parts arranged in this manner the button 29 is drawn downwardly with the pin 25 in the recess 22 and the mirror 19 is adjusted to a suitable position for looking toward the rear, as through the rear window or from a side of the vehicle and with the mirror adjusted to suit an operator of the vehicle the button is pressed upwardly to the neutral position with the latch pins 13 and 16 snapping into openings in the corresponding segments.

With the mirror adjusted to this position an occupant of the front seat may turn the mirror or adjust the position thereof to suit his convenience with the latch pins remaining in position and with the brake drums turning to follow the position of the mirror. Should the operator of the vehicle require the mirror it is only necessary to snap the button 29 upwardly with the pin 25 in the recess 24 whereby the brakes are released and the springs 57 and 83 act upon the brake drum to return the drum to neutral position with the mirror returning to the adjusted position to which it was previously set by the operator of the vehicle.

The mounting may be used for a mirror positioned in the center or adjacent the windshield of the vehicle, as indicated by the numeral 95, or to a position at one side of the vehicle, as indicated by the numeral 96.

The housing 17 may be of any type or design and the base 18, upon which the housing is mounted may be provided with a mounting flange 97, as shown in Figure 1 through which the mirror mounting may be secured by bolts 98 to a motor vehicle, as indicated by the numeral 99.

It will be understood that modifications may be made in the design and arrangement of the parts without departing from the spirit of the invention.

What is claimed is:

1. A mirror mounting comprising a horizontally disposed drum, a vertically disposed drum, a bracket mounting the vertically disposed drum above and on the said horizontally disposed drum, a mirror mounting bracket carried by the vertically disposed drum, latch pins for retaining the said drums in adjusted positions, brake bands on said drums for frictionally holding the drums, means withdrawing the latch pins for releasing the drums, and means actuating the said brake bands also for releasing the drums.

2. A mirror mounting comprising a horizontally disposed drum, a vertically disposed drum, a bracket mounting the vertically disposed drum above and on the said horizontally disposed drum, a mirror mounting bracket carried by the vertically disposed drum, latch pins for retaining the said drums in adjusted positions, brake bands on said drums for frictionally holding the drums, means withdrawing the latch pins for releasing the drums, means actuating the said brake bands also for releasing the drums, and resilient means returning the drums to neutral positions when released by the brake bands.

3. A mirror mounting comprising a horizontally disposed drum, a vertically disposed drum, a bracket mounting the vertically disposed drum above and on the said horizontally disposed drum, a mirror mounting bracket carried by the vertically disposed drum, latch pins for retaining the said drums in adjusted positions, segments with openings therein positioned to receive the said latch pins, brake bands on said drums for frictionally holding the drums, means withdrawing the latch pins for releasing the drums, means actuating the said brake bands also for releasing the drums, and resilient means returning the drums to neutral positions when released by the brake bands.

4. A mirror mounting comprising a horizontally disposed drum, a vertically disposed drum, a bracket mounting the vertically disposed drum above and on the said horizontally disposed drum, a mirror mounting bracket carried by the vertically disposed drum, latch pins for retaining the said drums in adjusted positions, brake bands on said drums for frictionally holding the drums, means withdrawing the latch pins for releasing the drums, means actuating the said brake bands also for releasing the drums, resilient means returning the drums to neutral positions when released by the brake bands, and a stem having a button on the outer end for actuating the said latch pin withdrawing means and brake band actuating means.

5. In a motor vehicle mirror mounting the combination which comprises a mounting housing, a horizontally disposed drum having a brake band thereon journaled in the housing, a vertically disposed drum also having a brake band thereon journaled on the horizontally disposed drum, segments having spaced openings therein, the radii of which are centered on the centers of the drums, respectively, latch pins positioned to coact with the openings of the segments for retaining the drums in adjusted positions, a stem having a button on the outer end for withdrawing the said latch pins from the segments, and means releasing the brake bands of the drums by the said stem.

CHESTER L. DAVIS.

REFERENCES CITED

The following references are of record in the file of this patent:

UNITED STATES PATENTS

| Number | Name | Date |
|---|---|---|
| 1,364,268 | Fletcher | Jan. 4, 1921 |
| 2,424,222 | Brown et al. | July 22, 1947 |
| 2,504,386 | Brady et al. | Apr. 18, 1950 |
| 2,534,495 | Younghusband | Dec. 19, 1950 |